Nov. 8, 1938.   T. F. ALLEN   2,136,068
MEANS FOR HANDLING HARVESTING APPARATUS
Filed May 4, 1936   2 Sheets-Sheet 1
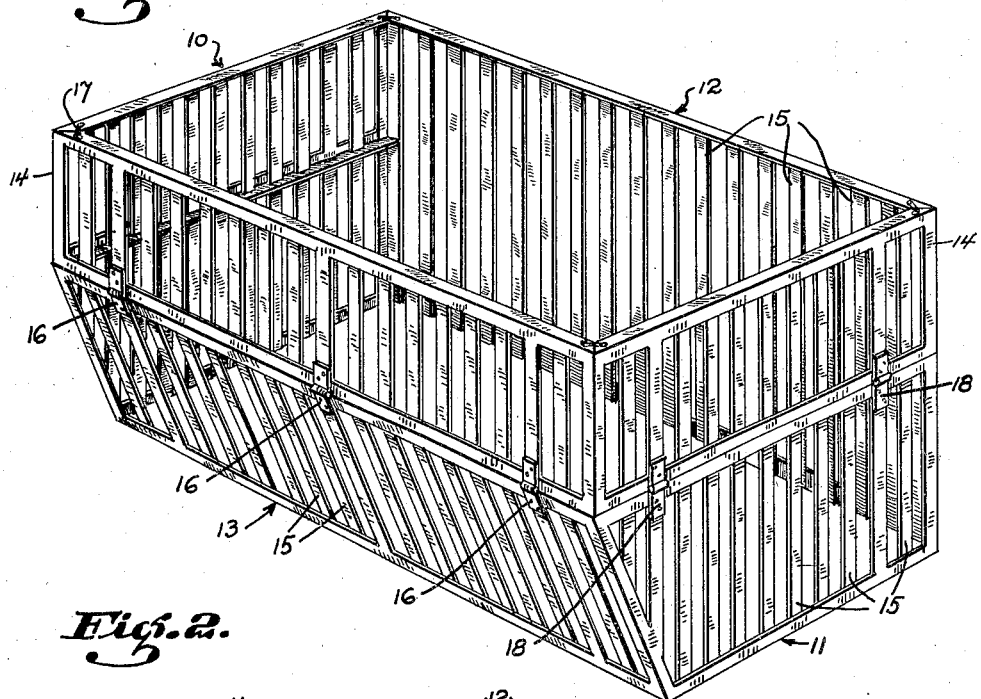
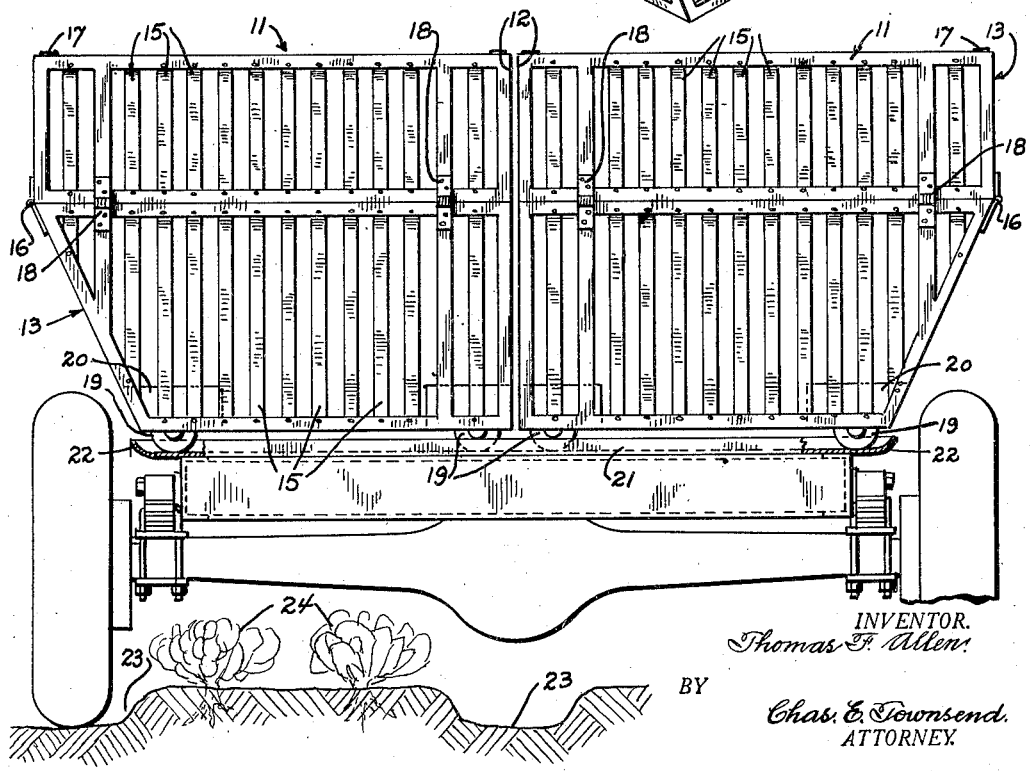
INVENTOR.
Thomas F. Allen
BY
Chas. E. Townsend.
ATTORNEY.

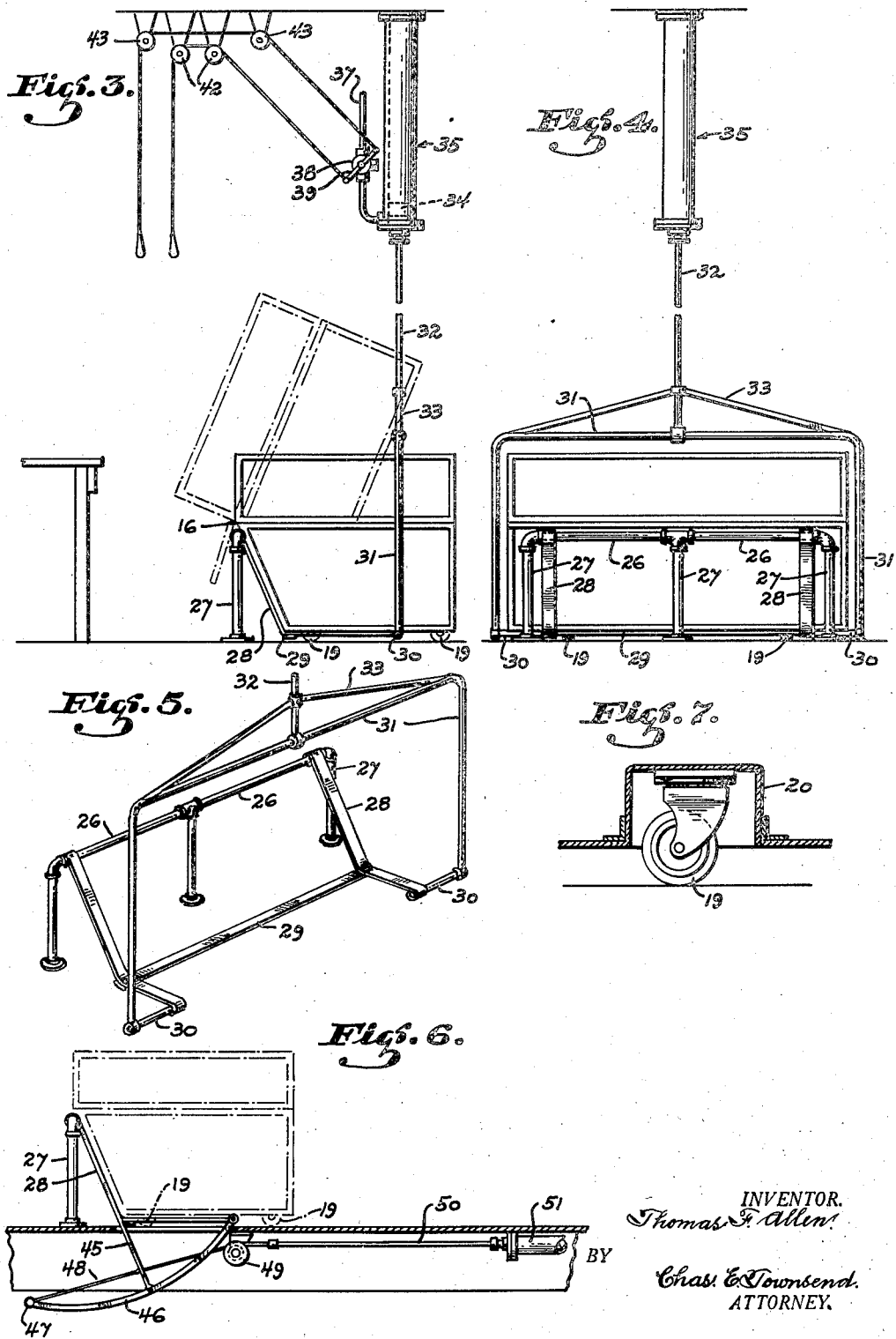

Patented Nov. 8, 1938

2,136,068

UNITED STATES PATENT OFFICE 2,136,068

MEANS FOR HANDLING HARVESTING APPARATUS

Thomas F. Allen, Watsonville, Calif.

Application May 4, 1936, Serial No. 77,711

3 Claims. (Cl. 214—1.1)

This invention relates to improvements in harvesting apparatus and particularly to apparatus for harvesting lettuce and other vegetables that may be harvested in a manner similar to lettuce.

Lettuce fields are customarily laid out in beds separated by irrigating ditches. The ditches are approximately six inches deep and spaced about thirty-six to forty-two inches center to center and lettuce is planted two rows to the bed between the ditches.

It is common practice to run trucks through the fields about every twenty beds, carrying empty crates to be distributed along the beds. Pickers then cut the lettuce by hand and toss it into rows in the ditches, where it is picked up by packers and placed in the crates which are thereafter reloaded onto the truck. Standard gauge trucks are compelled to run with one wheel in a ditch and the other wheel on top of a bed often destroying some of the growing lettuce. The crates used under this method must be relatively small to facilitate their being stacked five or six high on the truck and to provide for their convenient handling in packing sheds where each head of lettuce is inspected and trimmed of its outer leaves before being packed for shipment to the retailer. The trimming operation necessitates unpacking of the lettuce and repacking it in crates for marketing.

Trucks of greater gauge and maximum clearance have been developed to make it possible to drive through the field at any point with the wheels of the truck following along alternate ditches. Loading the trucks directly from the field has also been contemplated but involves either a further handling of the lettuce before it is available to the trimmers or the use of crates or baskets so large that they are not susceptible to being conveniently handled in the packing shed where they must be made readily accessible to the trimmers.

It is the object of the present invention to overcome the above and other disadvantages through the provision of improved harvesting apparatus. It is, more specifically, the object of this invention to provide an improved basket and apparatus for facilitating the handling of the basket both on the truck and at the trimmers' bench in the packing shed, and to reduce to a minimum the necessity for handling the individual heads of lettuce in a manner that might result in their becoming soiled or bruised. Further objects and advantages of the invention are made apparent in the following specification, wherein reference is made to the accompanying drawings illustrating one form thereof.

While the form of the invention illustrated is adapted to the harvesting of lettuce and while the term "lettuce" is used throughout the specification, it is, of course, to be understood that the invention is readily adaptable to the harvesting of other vegetables and is not limited in its use to any one.

In the drawings—

Fig. 1 is a perspective view of a basket constructed in accordance with the invention;

Fig. 2 is a rear elevation of a truck illustrating the manner in which the invention contemplates supporting baskets thereon;

Fig. 3 is an end elevation of basket handling apparatus at a trimmer's bench;

Fig. 4 is a front view of the apparatus illustrated in Fig. 3;

Fig. 5 is a perspective view of a portion of the apparatus illustrated in Figs. 3 and 4;

Fig. 6 is an end view of a modification of the basket-handling apparatus illustrated in Fig. 3; and Fig. 7 is an enlarged detail view of one of the casters employed on the baskets.

The basket illustrated in Fig. 1 comprises a front end 10, a back end 11, an inner side 12 and an outer side 13. It is constructed for strength and lightness and is preferably formed with metal frame members 14, of angular cross section, and spaced slats 15 of a light durable grade of wood. The angular frame sections may be welded or bolted together and the slats 15 are preferably riveted to the frame. If it is desired to provide a basket which may be partially disassembled for shipment and storage, the slats may be riveted to flat metal bars which, in turn, may be bolted or otherwise releasably secured to the angular frame members wherever it is desired to separate the sides of the basket to permit its being broken down for convenient handling.

It is contemplated that four such baskets be used for each truck or trailer unit, but this number may, of course, be varied if it is found desirable to reduce the size of the baskets or increase the size of the trucks; the relative size should, however, be such that an even number of baskets fits upon a truck without wasting any available loading space. The baskets are placed in pairs with their inner sides 12 abutting along the longitudinal central line of the truck, as illustrated in Fig. 2; and as many pairs as desired are placed upon each truck or trailer unit.

The lower portions of the outer sides 13 are slanted inwardly, as illustrated, to provide clearance for the truck tires which sometimes extend above the top surface of the chassis of the truck. The upper portion of the outer side 13 of each basket is formed as a gate and secured to the basket by hinges 16 so that it may be swung downwardly, and is normally retained in its upper or closed position by means of small hooks 17 engaging its upper corners. These gates serve the purpose of lowering the edge of the basket over which the lettuce must be tossed after it has been picked, and thus prevent unnecessary bruising of the lettuce caused by its falling into the bottom of the empty basket. The hinged gate is also useful in connection with removing the lettuce from the basket, as will appear hereinafter.

The upper portion of the rear end 11 of the basket shown in Fig. 1 is also in the form of a gate having hinges 18 and operating in the same manner as the gate on the outer side of the basket, so that this side may also be lowered during the loading of the lettuce. This, however, is only necessary on the baskets which occupy the rearmost position on the truck and where four or more baskets are being used to each truck; and it is, therefore, necessary that only two of them be provided with such gates at their back ends.

The bottoms of the baskets may be made of any suitable material and are provided with sets of four swivel casters 19, one of which is shown in detail in Fig. 7. The bottoms are preferably formed with box-like recesses 20 which house the casters and reduce the overall height of the basket.

To reduce to a minimum the height of the baskets on the truck, the customary body of the truck may be eliminated altogether and channel-shaped tracks 21 (see Fig. 2) may be provided to span the frame members of the truck and receive the casters of the baskets. The ends 22 of these members are shown as bent upwardly to prevent the baskets from rolling off of the truck. The channel-shaped tracks (illustrated in Fig. 2) are disposed transversely of the truck chassis but may be longitudinally arranged so that the baskets are placed on the truck from the rear rather than from the sides, if desired.

In Fig. 2 the manner in which the truck moves through the field of growing lettuce is illustrated, the wheels following alternate ditches 23 and the axle housing clearing the heads of lettuce 24 which grow in the beds between the ditches.

The baskets are loaded onto the truck before it enters the field and the hinged side gates of the baskets are lowered so that the first lettuce-heads that are tossed into the baskets will not be unduly bruised when the baskets are filled with lettuce up to the level of the lower edge of the gates when the gates are raised. As soon as the baskets are full, the truck is driven to the packing house and the filled baskets are removed by any suitable hoisting apparatus.

In the packing house there are arranged trimmers' benches as shown in Fig. 3. The apparatus shown in Figs. 3, 4 and 5 is provided to facilitate handling of the lettuce by the trimmers who work at the benches and whose duty it is to remove the soiled or broken outer leaves from the heads of lettuce before they are packed in crates for shipment. This apparatus comprises a horizontally disposed bar 26 rigidly supported by uprights 27 at a level just below the hinges 16 on the outer side of the basket. A pair of rigid metal straps 28 are bent about the bar 26 to pivot thereon and are formed to follow the contour of the outer lower corner of the basket. The straps are joined by a spreader 29 which maintains them a suitable distance apart. The straps 28 and spreader 29 form a cradle which rocks about the bar 26 as a support to tilt the basket and facilitate the removal of the lettuce therefrom by the trimmers. The lower outer ends of the straps 28 are provided with outwardly extending pins 30, which pins are rotatably connected with the lowermost ends of an inverted U-shaped spreader 31, which is connected by a rod 32 and braces 33 with the piston 34 of a pneumatic hoist, generally indicated at 35. The baskets of lettuce having been removed from the truck and placed upon the floor adjacent to the trimmer's stand, are pushed into position over the cradle described above, and the trimmer stands between the basket and the trimming bench 25 and picks the heads of lettuce from the basket. As the level of lettuce in the baskets gets too low for convenience, the hoist 35 is actuated to lift the cradle, causing it to pivot about the bar 26 and causing the basket to assume the dotted-line position illustrated in Fig. 3, or, if more convenient, assume any position between that illustrated in dotted lines and that illustrated in full lines in Fig. 3. When the basket assumes the dotted-line position, the hinged gate may be unlatched (as shown) to fall downwardly, thereby making the remaining contents of the basket even more easily accessible to the trimmer.

The hoist illustrated in the drawings is of the pneumatic type and comprises a cylinder having a reciprocable piston 34 therein. Compressed air from a suitable source of supply (not shown) is delivered through a pipe 37 and is controlled by means of a conventional three-way valve 38 to be directed into the cylinder to effect lifting action, or to be exhausted to permit the basket and cradle to return to their normal position on the floor. The valve 38 is provided with a double-ended operating handle 39 which may be controlled from the point where the trimmer is working through suitable cords 40 and 41 led over sheaves 42 and 43, respectively, and connected with the valve handle 39.

An air hoist has been shown as the preferred form of power for raising the baskets in their cradles, but it is apparent that any other source of power will accomplish the same result; for example, a hydraulic hoist or electric hoist would be just as effective. Hand-operated chain blocks are also suitable for this purpose, but, of course, considerably slower in their operation than any of these well known types of power hoists.

A modified form of hoist is illustrated in Fig. 6, and the arrangement illustrated in this figure is designed to conceal the operating parts of the hoist and to eliminate the necessity of overhead mechanisms. In this modification, the straps 28 of the cradle are extended downwardly, as at 45, through a suitable opening in the floor and the lower ends of these extensions are connected with the outer ends of the straps 28 by arcuate members 46, which extend rearwardly and are joined by a transversely extending bar 47 which is engaged by a flexible cable 48 led over a sheave 49 and connected with the piston rod 50 of a pneumatic hoist 51, only a portion of which is illustrated, and which is secured by any suitable means to the under surface of the floor of the packing house. The cradle is actuated to swing the basket by operation of the hoist 51 to pull inwardly upon the cable 48 and thus through the arcuate member 46 impart a swinging movement to the cradle about the horizontal bar 26.

The invention as illustrated and as described above greatly simplifies the harvesting of lettuce, or the like, and increases the efficiency of the harvesting and packing operations. With the improved apparatus the lettuce is handled but once in the field by the pickers who place it directly into the basket from which it is to be taken by the trimmers. The heads of lettuce are never placed upon the ground to become soiled and are subjected less to the possibility of being bruised by repeated handling. The period of time that the cut lettuce is subjected to the wilting heat of the sun is also reduced. When the large baskets reach the packing shed the apparatus for handling them makes it possible for the trimmers to work directly out of them and, therefore, to work continuously for a period of time much greater than is possible with previously known methods where the smaller crates had to be replaced at the trimmers' bench very frequently.

While a more or less specific form of the invention is herein described, it is to be understood that various changes may be resorted to in the construction and arrangement of the several parts thereof within the scope of the appended claims.

What I claim is—

1. An apparatus for tipping lettuce baskets or the like which comprises a pair of pivotally supported straps formed to extend under a portion of the basket and having rigid arms extending downwardly to a point beneath the floor level, a hoisting mechanism disposed horizontally beneath the floor level, and means connecting said mechanism and said arms to effect tipping of the basket disposed over said straps.

2. An apparatus for tipping lettuce baskets or the like which comprises a cradle pivoted adjacent one side of the basket and extending down said one side and beneath the basket whereby baskets on casters may be freely moved to and from the cradle from the opposite side thereof, and a hoisting means engaging the cradle at a point beneath the basket, said hoisting means including an inverted U-shaped spreader paralleling the top and two ends of a basket positioned in the cradle.

3. An apparatus for tipping lettuce baskets and the like comprising a horizontally disposed bar, and a cradle supported thereby, said cradle including a pair of straps pivoted to said bar and extending downwardly therefrom and then parallel to the floor to lie beneath the basket and permit the basket to be moved to and from the cradle, and hoisting means including an inverted U-shaped spreader overlying the cradle and engaging the same beneath the basket.

THOMAS F. ALLEN.